US009881482B2

(12) United States Patent
Kleen et al.

(10) Patent No.: US 9,881,482 B2
(45) Date of Patent: Jan. 30, 2018

(54) METHOD AND DEVICE FOR DISPLAYING INFORMATION OF A SYSTEM

(71) Applicants: VOLKSWAGEN AG, Wolfsburg (DE); AUDI AG, Ingolstadt (DE); SCANIA CV AB, Södertälje (SE)

(72) Inventors: Andro Kleen, Duisburg (DE); Erik Glaser, San Francisco, CA (US)

(73) Assignees: VOLKSWAGEN AG, Wolfsburg (DE); AUDI AG, Ingolstadt (DE); SCANIA CV AB, Södertälje (SE)

( * ) Notice: Subject to any disclaimer, the term of this patent is extended or adjusted under 35 U.S.C. 154(b) by 0 days.

(21) Appl. No.: 14/767,834

(22) PCT Filed: Feb. 11, 2014

(86) PCT No.: PCT/EP2014/052645
§ 371 (c)(1),
(2) Date: Aug. 13, 2015

(87) PCT Pub. No.: WO2014/124936
PCT Pub. Date: Aug. 21, 2014

(65) Prior Publication Data
US 2015/0371527 A1 Dec. 24, 2015

(30) Foreign Application Priority Data

Feb. 13, 2013 (DE) ........................ 10 2013 002 533

(51) Int. Cl.
B60Q 1/00 (2006.01)
G08B 21/24 (2006.01)
(Continued)

(52) U.S. Cl.
CPC ............. G08B 21/24 (2013.01); B60K 35/00 (2013.01); B62D 1/00 (2013.01); H04W 72/04 (2013.01);
(Continued)

(58) Field of Classification Search
None
See application file for complete search history.

(56) References Cited

U.S. PATENT DOCUMENTS 5,774,069 A    6/1998  Tanaka et al.
6,226,570 B1 * 5/2001  Hahn .................. B60K 28/066
                                                    701/1
(Continued)

FOREIGN PATENT DOCUMENTS

CN    101739843 A    6/2010
CN    102717766 A   10/2012
(Continued)

OTHER PUBLICATIONS

International Preliminary Report on Patentability, dated Aug. 27, 2015, issued in corresponding International Application No. PCT/EP2014/052645.
(Continued)

Primary Examiner — Adolf Dsouza
(74) Attorney, Agent, or Firm — Andrews Kurth Kenyon LLP

(57) ABSTRACT

Systems and methods for displaying information of a system use at least one control unit to detect and communicate system information to a mobile terminal device within a predetermined range of the system. Information about a state of the system may be displayed on a display unit of the system and transmitted to the mobile terminal device via a communication channel established between the control unit and the mobile terminal device. The system may be a vehicle and the system information a status of the automatic driving mode of the vehicle.

11 Claims, 1 Drawing Sheet

(51) Int. Cl.
   *B62D 1/00*   (2006.01)
   *B60K 35/00*  (2006.01)
   *H04W 72/04*  (2009.01)

(52) U.S. Cl.
   CPC ............... *B60K 2350/1068* (2013.01); *B60K 2350/1072* (2013.01); *B60K 2350/357* (2013.01)

(56) References Cited

U.S. PATENT DOCUMENTS

| | | | |
|---|---|---|---|
| 8,260,482 | B1 | 9/2012 | Szybalski et al. |
| 8,438,110 | B2 * | 5/2013 | Calman ............... G06Q 40/02 705/30 |
| 2013/0006715 | A1 | 1/2013 | Warkentin et al. |
| 2013/0144482 | A1 * | 6/2013 | Tuukkanen ........... G06F 3/0482 701/29.6 |
| 2014/0218529 | A1 * | 8/2014 | Mahmoud ............. H04N 7/181 348/148 |

FOREIGN PATENT DOCUMENTS

| | | |
|---|---|---|
| DE | 196 48 943 | 6/1997 |
| DE | 197 43 024 | 4/1999 |
| DE | 10 2008 034 606 | 1/2010 |
| DE | 10 2009 041 587 | 3/2011 |
| DE | 10 2009 043 589 | 3/2011 |
| DE | 10 2009 059 142 | 4/2011 |
| DE | 10 2009 050 404 | 5/2011 |
| DE | 20 2011 100 804 | 7/2011 |
| DE | 10 2011 079 703 | 1/2013 |
| DE | 10 2011 120 991 | 1/2013 |
| JP | 2002-362186 A | 12/2002 |
| KR | 10-0613233 B1 | 8/2006 |
| KR | 10-2009-0029442 A | 3/2009 |

OTHER PUBLICATIONS

International Search Report and Written Opinion, dated Aug. 4, 2014, issued in corresponding International Application No. PCT/EP2014/052645.

* cited by examiner

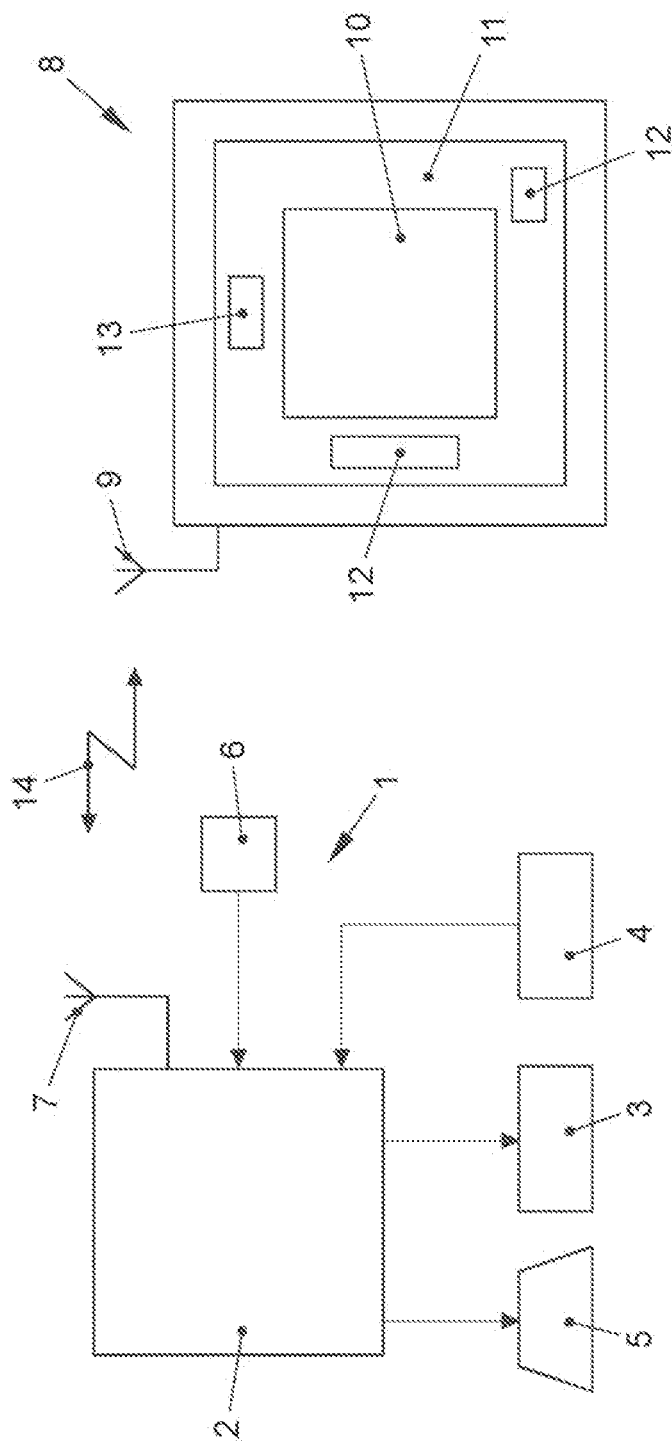

METHOD AND DEVICE FOR DISPLAYING INFORMATION OF A SYSTEM

CROSS REFERENCE TO RELATED APPLICATIONS

The present application claims priority to Application No. 10 2013 002 533.8, filed in the Federal Republic of Germany on Feb. 13, 2013, which is expressly incorporated herein in its entirety by reference thereto.

FIELD OF THE INVENTION

The present invention relates to displaying information of a system, in particular of a motor vehicle, which has at least one mode for automatic driving.

BACKGROUND INFORMATION

In the context of displaying information, U.S. Pat. No. 8,260,482 describes a method for displaying information of a motor vehicle, the motor vehicle having at least one mode for automatic driving. For this purpose, the motor vehicle has at least one display unit, on which a state of the system is displayed. Information is thus displayed, for example, to indicate whether the system is at all currently able to ensure automatic driving or not. Furthermore, an indication is displayed if the vehicle is currently operated in the automatic driving mode. If the system detects that the driver must again take over the vehicle, then the driver is prompted acoustically or visually to take over the vehicle. For this purpose, the system must ensure that the driver detects the takeover request. This problem is also encountered in machines that must be monitored or also in airplanes equipped with auto-pilot. Particularly in situations where the user is occupied with a mobile terminal device (such as for example a smart phone or a tablet PC), a visual perception of a takeover request is no longer ensured.

Example embodiments of the present invention are based on the technical problem of providing a method and a device for displaying information of a system, in which a user who is occupied with a mobile terminal device is nevertheless reached reliably by way of information technology, as well as of creating a computer program product for carrying out the method.

SUMMARY

According to example embodiments of the present inventions, the method for displaying information of a system is implemented by way of at least one control unit and one display unit, the display displaying at least one item of information about a state of the system. The control unit furthermore has means for detecting a mobile terminal device in the range of the system and means for establishing a communication channel between the control unit and the mobile terminal device. The means for detecting the mobile terminal device may be designed for example as an input unit, via which the mobile terminal device is logged on to the control unit. According to an embodiment, the control unit has means by which a mobile terminal unit is detected automatically in that communication signals are monitored for example. The extent of the range may be predetermined and depends on the system. If the system is a motor vehicle for example, then the range may be limited to a few meters and may be between 1 m and 3 m. Via the communication channel, at least one item of information about a state of the system is transmitted to the mobile terminal device and is displayed on a display unit of the mobile terminal device. This ensures that the user receives information about the system state even if he is occupied with his mobile terminal device. The system may be, for example, a machine to be monitored, an airplane or a motor vehicle, in particular a motor vehicle having at least one mode for automatic driving. In motor vehicles without a mode for automatic driving, the information display primarily benefits the front-seat passenger. The information for displaying the state of the system may be conveyed alphanumerically and/or in the form of pictographs and/or by colors and/or by images.

According to an exemplary embodiment, the display unit of the mobile terminal device may be divided into at least two areas, user data being displayed in a first area and the state of the system being displayed in a second area. This makes it possible for the user to perceive and distinguish the different items of information readily. It should be noted that the division into two areas preferably occurs only by way of software such that when operating the mobile terminal device outside of the system, the full display unit is available for user data.

According to an exemplary embodiment, the second area may be developed as a frame that frames the first area. Thus the user data of the mobile terminal device are displayed centrally, while the information about the state of the system is displayed by the frame. For example, the color of the frame changes depending on the system state. Alternatively or additionally, pictographs, images or other graphical and/or alphanumerical displays may be displayed in the frame. If the system is a motor vehicle, for example, that has a mode for automatic driving, then a green frame may symbolize the flawless automatic operation. A yellow frame, for example, symbolizes an automatic operation on the basis of poor sensor data, i.e. a takeover is not yet necessary, but soon probable. A red frame symbolizes, for example, that an immediate takeover by the driver is necessary.

According to an exemplary embodiment, the system is a motor vehicle, which has at least one mode for automatic driving, the display of user data on the display unit of the mobile terminal device being interrupted in the event of a system state in which the driver of the motor vehicle is to take over the motor vehicle again. In a visual manner, this makes it possible that the user is not distracted further and grasps the situation quickly. The interruption of the user data in the mobile terminal device may also occur in a system developed as an airplane or a machine.

According to an exemplary embodiment, the takeover request is displayed in the area in which the user data were previously displayed. This ensures that the user detects the request as quickly as possible.

According to an exemplary embodiment, the control unit issues an acoustic takeover request. This preferably occurs in parallel with a visual takeover request on the display unit of the mobile terminal device and the at least one display unit of the system. This ensures that the user perceives the takeover request even if the user is currently not looking at the display unit of the mobile terminal device.

According to an exemplary embodiment, data of at least one driving environment sensor system are displayed on the display unit of the mobile terminal device. The driving environment sensor system may be a radar sensor system, for example, or a sensor system of a lane change assistant, for example in the form of a camera. Alternatively or additionally, it is also possible to display environmental information from a Car2x communication. Furthermore, it is also possible to display data of the host vehicle that provide information about the current status and about actions planned by the system. This may be for example steering angle information, speed values or acceleration values.

The information about the system, which is displayed on the display unit of the mobile terminal device, may also be displayed on the at least one system-side display unit, i.e. the data are displayed redundantly, it not being necessary for the forms of display to be identical. The system-side display unit may be developed as an instrument cluster, a central display and/or as a head-up display.

According to an exemplary embodiment, a live stream of at least one driving environment sensor system developed as a camera is displayed on the display unit of the mobile terminal device, preferably when the motor vehicle driver is requested to take over the motor vehicle. Through the live stream, the motor vehicle driver already obtains an impression of the traffic situation that awaits him when taking over. Furthermore, the live stream is preferably displayed in the area of the display unit where previously the user data were displayed.

The device for displaying information of a system may include at least one control unit and at least one display unit, at least one item of information about a state of the system being displayed on the display unit, the control unit having means for detecting a mobile terminal device in the range of the system as well as means for establishing a communication channel between the control unit and the mobile terminal device, at least one item of information about a state of the system being transmitted to the mobile terminal device via the communication channel and being displayed on the display unit of the mobile terminal device.

A computer program product having program code that is stored on a computer-readable data carrier may be developed to execute on a processor the methods described herein.

Embodiments of the present invention are explained below in more detail.

BRIEF DESCRIPTION OF THE DRAWINGS

FIG. 1 shows a schematic block diagram of a device for displaying information of a motor vehicle having at least one mode for automatic driving.

DETAILED DESCRIPTION

According to FIG. 1, device 1 for displaying information of a motor vehicle having at least one mode for automatic driving includes at least one control unit 2 and at least one display unit 3, at least one item of information about a state of the motor vehicle being displayed on the display unit 3, for example an item of information about a state of the motor vehicle with respect to the mode for automatic driving. Display unit 3 is developed for example as an instrument cluster and/or as a head-up display and/or as a central display. In the simplest case, the information indicates whether the mode for automatic driving is active or not. Furthermore, device 1 includes at least one input unit 4, an acoustic output unit 5, at least one driving environment sensor system 6 as well as an air interface 7. It should be noted that control unit 2 is connected for example to additional control devices (not shown), by which the function of automatic driving is implemented.

Furthermore, an exemplary mobile terminal device 8 is displayed in FIG. 1, which likewise has an air interface 9. Mobile terminal device 8 has a display unit, which is divided into two areas. In this instance, a first area 10 is used primarily to display user data and a second area 11 is used to display information about the state of the motor vehicle. Second area 11 is developed as a frame that is situated around first area 10. For example, prepared data 12 of the driving environment sensor system and/or data 13 of vehicle sensors (not shown) such as for example steering angle information of a steering angle sensor are displayed in the second area 11.

Control unit 2 has means for detecting mobile terminal device 8. This detection may occur, for example, in that the mobile terminal device 8 is logged on via input unit 4. Alternatively or additionally, control unit 2 may have means that detect when mobile terminal device 8 is put into operation. Subsequently, a communication channel 14 is established, via which data may be transmitted at least from control unit 2 to mobile terminal device 8. The FIGURE shows that communication channel 14 is established via air interfaces 7, 9. This communication may occur for example in the infrared or in the RF range.

According to an embodiment, the mobile terminal device is connected to the electronic system of the vehicle by a cable connection such that the communication may also occur via cable.

According to an embodiment, the mode for automatic driving may include three states, namely, "automatic driving, all systems operate flawlessly," "automatic driving, at limited system quality" and "takeover by the motor vehicle driver required." The three states may be represented for example by an alphanumeric display and/or by a color (e.g. green, yellow, red). It shall now be assumed that the motor vehicle driver has activated the mode for automatic driving and that all systems operate flawlessly, and thus control unit 2 transmits this state to mobile terminal device 8. To display this state, second area 11 is displayed as green for example. In first area 10, by contrast, the driver of the motor vehicle is able to view user data such as a film for example. The colored second area 11 and the data 12, 13 displayed in it remind the driver of the motor vehicle that the motor vehicle is in an automatic driving mode. This produces a certain alertness so that the driver is able to take over the motor vehicle quickly if required. If subsequently the quality of the sensor data deteriorates for example, then this increases the probability that the motor vehicle driver must soon take over the motor vehicle. This may be displayed by a yellow coloration of second area 11. The yellow coloration increases the attentiveness of the motor vehicle driver. If thereupon an immediate takeover or a takeover within a certain time is necessary, the second area 11 is colored red. The display of the user data is preferably interrupted, and an alphanumeric takeover request is displayed in the first area. In parallel, there is an acoustic takeover request by an output of suitable warnings via acoustic output unit 5. Finally, a live stream of a driving environment sensor system 6 developed as a camera may also be displayed in first area 10 so that the motor vehicle driver immediately has an impression of the traffic situation. For this purpose, data 12 are preferably displayed in such a way that they already give an indication of the relative position with respect to the host vehicle. Thus, for example, vehicles located on the right behind the host vehicle may be displayed in the lower right corner of second area 11. It is also possible to highlight particularly relevant objects visually in the live stream.

Furthermore, information about platooning units may be available as well. Platooning refers to a concept of automatic driving in a formation, particularly for heavy commercial vehicles. A higher fuel efficiency is to be achieved by tight formations and a resulting lower air drag. Suitable symbols within the second area may be used to indicate that this mode continues to be active or that it must be canceled within a specific time span (e.g. due to deviating routes).

The invention claimed is:

1. A method for displaying information of a system with at least one control unit and a display unit, the method comprising:
    displaying on the display unit at least one item of information about a state of the system;
    detecting with the at least one control unit, a mobile terminal device in a predetermined range of the system;
    establishing a communication channel between the at least one control unit and the mobile terminal device;
    using the communication channel, transmitting the at least one item of information to the mobile terminal device;
    displaying the at least one item of information on a display of the mobile terminal device; and
    displaying data of at least one driving environment sensor on the display unit of the mobile terminal device;
    wherein the display of the mobile terminal device is divided into at least two areas and user data is displayed in a first one of the at least two areas and the at least one item of information is displayed in a second one of the at least two areas;
    wherein the system is a motor vehicle that has at least one mode for automatic driving; and
    wherein the at least one driving environment sensor includes a camera assigned to the motor vehicle, the displaying on the display unit includes displaying a live stream of data from the camera when the system is about to exit the automatic driving mode and requests a driver of the motor vehicle to take over the motor vehicle, the live stream indicates a traffic situation with respect to the motor vehicle, and the displaying of the live stream highlights relevant objects of the traffic situation visually in the live stream.

2. The method of claim 1, wherein a second one of the at least two areas frames a first one of the at least two areas.

3. The method of claim 1, further comprising interrupting the display of user data on the mobile terminal device when the system is about to exit the automatic driving mode.

4. The method of claim 3, wherein said interrupting comprises displaying a takeover request in the first one of the at least two areas.

5. The method of claim 3, further comprising issuing an acoustic takeover request.

6. A device for displaying information of a system comprising:
    a display unit that displays at least one item of information about a state of the system; and
    at least one control unit that detects a mobile terminal device in a predetermined range of the system, establishes a communication channel with the mobile terminal device and transmits the at least one item of information to the mobile terminal device;
    wherein the at least one item of information is displayed on a display of the mobile terminal device;
    wherein the display unit displays data of at least one driving environment sensor;
    wherein the display of the mobile terminal device is divided into at least two areas and user data is displayed in a first one of the at least two areas and the at least one item of information is displayed in a second one of the at least two areas;
    wherein the system is a motor vehicle that has at least one mode for automatic driving; and
    wherein the at least one driving environment sensor includes a camera assigned to the motor vehicle, and the display unit displays a live stream of data from the camera when the system is about to exit the automatic driving mode and requests a driver of the motor vehicle to take over the motor vehicle, the live stream indicates a traffic situation with respect to the motor vehicle, and the display unit highlights relevant objects of the traffic situation visually in the live stream.

7. The device of claim 6, wherein the display of user data at the mobile terminal device is interrupted when the system is about to exit the automatic driving mode.

8. The device of claim 7, wherein interrupting the display comprises displaying a takeover request in the first one of the at least two areas.

9. A non-transitory computer readable medium storing instructions that when executed by a computer, perform a method for displaying information of a system having at least one control unit and a display unit, the method comprising:
    displaying on the display unit at least one item of information about a state of the system;
    detecting with the at least one control unit, a mobile terminal device in a predetermined range of the system;
    establishing a communication channel between the at least one control unit and the mobile terminal device;
    using the communication channel, transmitting the at least one item of information to the mobile terminal device;
    displaying the at least one item of information on a display of the mobile terminal device; and
    displaying data of at least one driving environment sensor on the display unit of the mobile terminal device;
    wherein the display of the mobile terminal device is divided into at least two areas and user data is displayed in a first one of the at least two areas and the at least one item of information is displayed in a second one of the at least two areas;
    wherein the system is a motor vehicle that has at least one mode for automatic driving; and
    wherein the at least one driving environment sensor includes a camera assigned to the motor vehicle, the displaying on the display unit includes displaying a live stream of data from the camera when the system is about to exit the automatic driving mode and requests a driver of the motor vehicle to take over the motor vehicle, the live stream indicates a traffic situation with respect to the motor vehicle, and the displaying of the live stream highlights relevant objects of the traffic situation visually in the live stream.

10. The non-transitory computer readable medium of claim 9, the method further comprising interrupting the display of user data on the mobile terminal device when the system is about to exit the automatic driving mode.

11. The non-transitory computer readable medium of claim 10, wherein said interrupting comprises displaying a takeover request in the first one of the at least two areas.

* * * * *